June 30, 1925.
J. BLACKBURN
1,543,821
FOOT SPEED SELECTOR FOR AUTOMOBILE TRANSMISSIONS
Filed Aug. 13, 1921   3 Sheets-Sheet 3
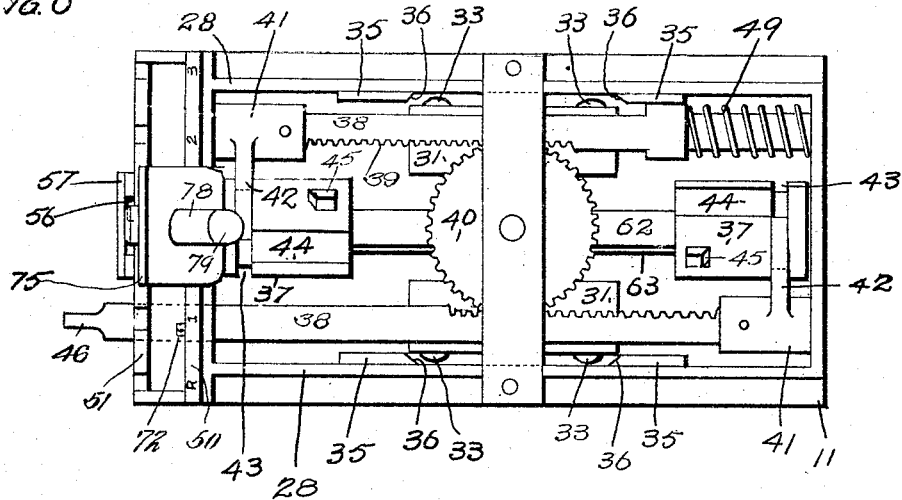
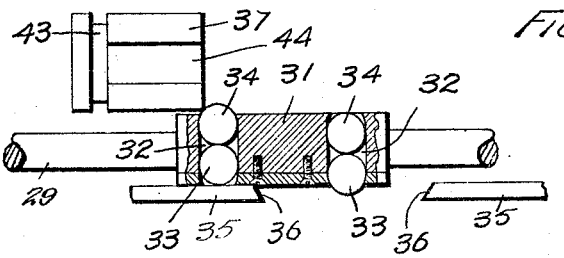
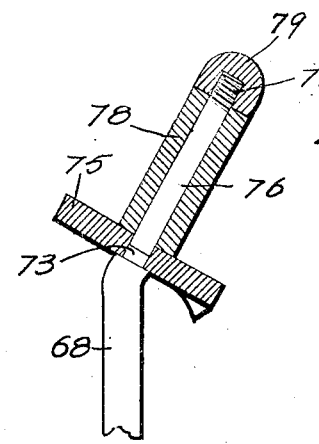
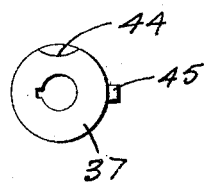
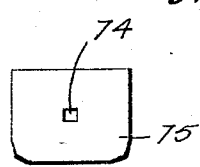
INVENTOR
JASPER BLACKBURN
BY Edmond E Langan
ATTY.

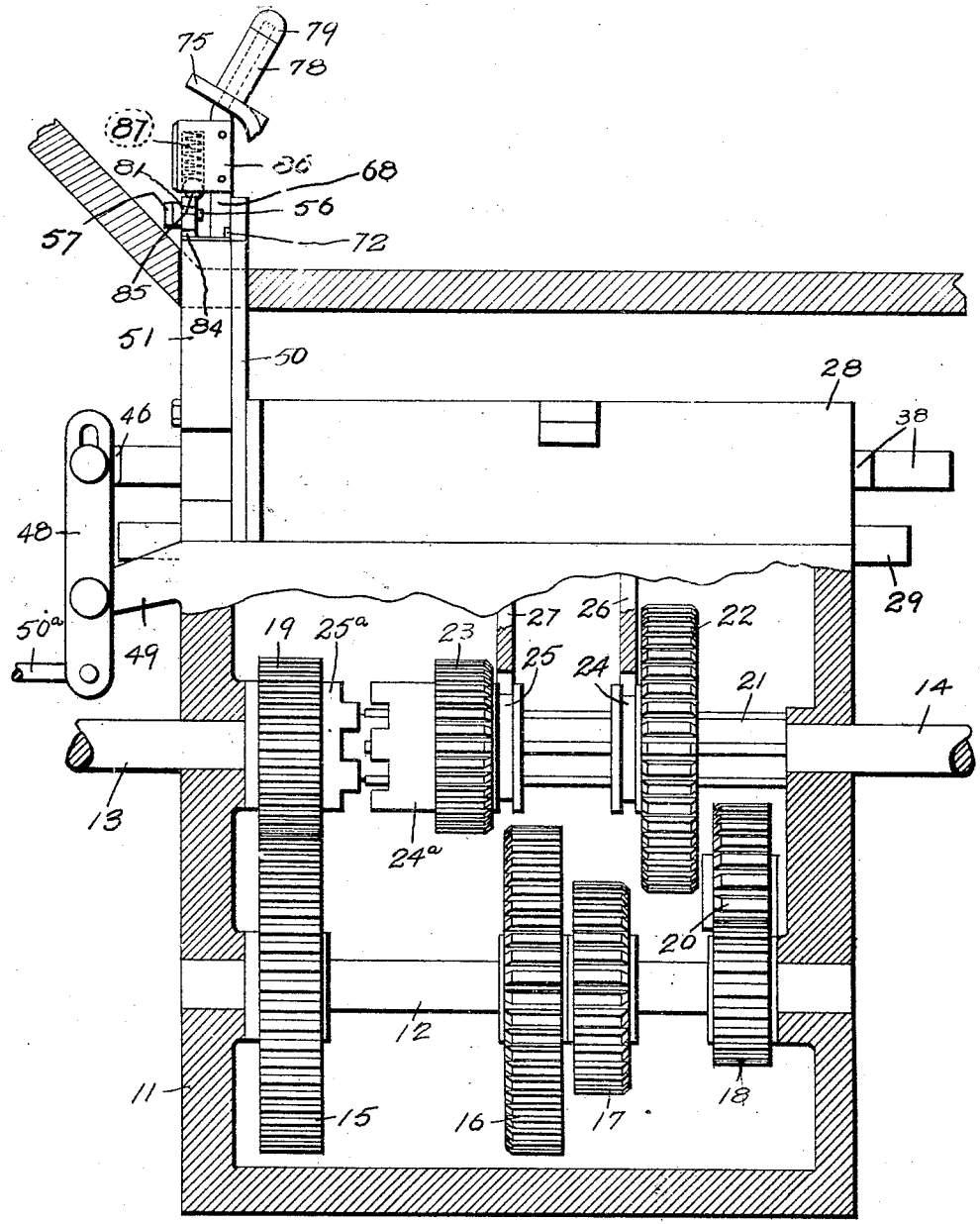

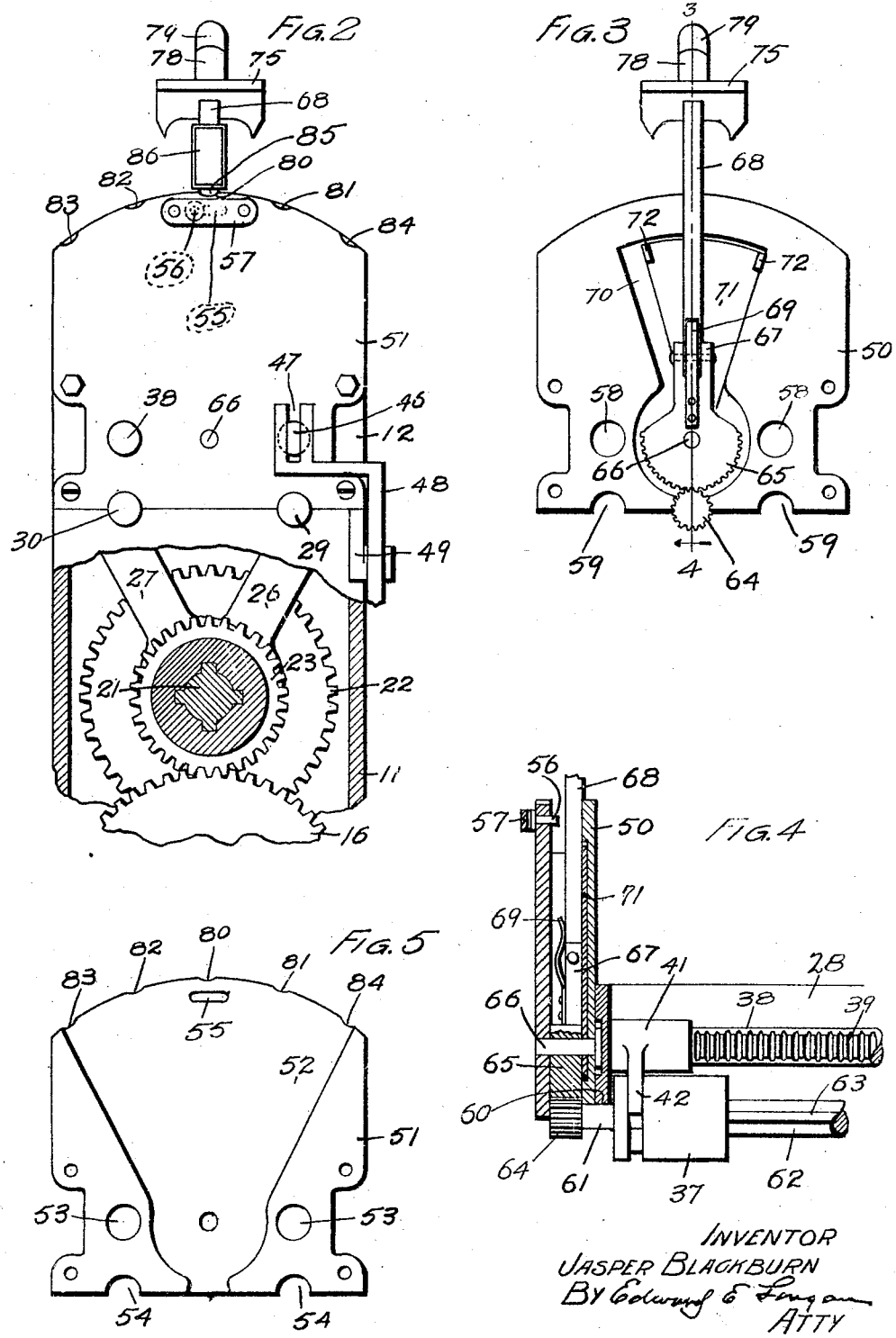

Patented June 30, 1925.

1,543,821

UNITED STATES PATENT OFFICE.

JASPER BLACKBURN, OF WEBSTER, MISSOURI.

FOOT-SPEED SELECTOR FOR AUTOMOBILE TRANSMISSIONS.

Application filed August 13, 1921. Serial No. 492,100.

*To all whom it may concern:*

Be it known that I, JASPER BLACKBURN, a citizen of the United States, and resident of the city of Webster, county of St. Louis, and State of Missouri, have invented certain new and useful Improvements in Foot-Speed Selectors for Automobile Transmissions, of which the following is a specification, containing a full, clear, and exact description, reference being had to the accompanying drawings, forming a part hereof.

My invention relates to improvements in foot speed selectors for automobile transmissions, and has for its primary object a sliding gear transmission for automobiles in which the hand operated gear shift is disposed of and the gear selecting accomplished by a lever operated by the foot.

A further object is to construct a sliding gear transmission for automobiles in which the speed is selected by a foot controlled lever and the actual shifting of the gears to the preselected speed accomplished by operating the clutch.

A still further object is to construct a foot speed selector for automobile transmissions of the sliding gear type which is operated by a foot lever and which may be so set that when the transmission is in high or direct drive, that the throwing out of the clutch will simultaneously shift it back into either second, low or neutral.

In the drawings—

Fig. 1 is a side elevation of a sliding gear transmission embodying my improvement with portions broken away and in section.

Fig. 2 is a front view of the same showing portions broken away and in section.

Fig. 3 is a front view of the preselecting device with portions thereof removed.

Fig. 4 is a section with portions broken away, taken on the line 4—4 of Fig. 3.

Fig. 5 is an inside view of the cover for the shifting lever housing.

Fig. 6 is a top plan view of the device.

Fig. 7 is a fragmental sectional view of a portion of the shifting mechanism.

Fig. 8 is an enlarged fragmental section of the upper portion of the foot lever.

Fig. 9 is a front view of one of the shifting sleeves.

Fig. 10 is a plan view of the plate made use of in connection with the foot lever.

In the construction of my device I employ a sliding gear transmission which consists of the housing 11, countershaft 12, engine shaft 13, and the propeller shaft 14. On the countershaft 12 are mounted gears 15, 16, 17, and 18, the gear 15 meshing with the gear 19 which is secured to the engine shaft 13, these two gears placing the countershaft 12 into operation, and operating the gears 16, 17 and 18 which are rigidly secured to the countershaft. The gear 18 meshes with the gear 20. This is for the purpose of imparting a reverse motion to the propeller shaft 14, or in other words to drive the automobile backward. The propeller shaft 14 is provided with a portion 21 which is a splined shaft, or in other words a shaft provided with keys, and on this splined portion are mounted gears 22 and 23. The gear 22 is adapted to mesh with the gears 17 and 20, while the gear 23 meshes with the gear 16. The gear 23 is provided with a dental hub 24$^a$ which is adapted to engage with a similar hub 25$^a$ formed integral with the gear 19. The gears 22 and 23 are provided with grooved collars 24 and 25 into which the forks 26 and 27 extend. These forks are for the purpose of shifting the gears 22 and 23 on the portion 21. The gear 22 when shifted into the gear 17 is for low speed, while when shifted into the gear 20, it is for reverse. The gear 23 when shifted into the gear 16, drives at second speed, while when the hubs 24$^a$ and 25$^a$ are interlocked the machine is in direct or high gear. Secured on top of the housing 11 is a second housing 28 and in this housing are located the preselecting and shifting devices. The shifting devices comprise the shafts 29 and 30. These shafts are provided adjacent their central portions with rectangular enlargements 31. These enlargements are provided with bores 32 in which are located balls 33 and 34. The side walls of the housing 28 are further provided on their inner faces with extensions or projections 35. These projections are spaced apart and have inclined edges 36, which edges face each other and are for the purpose of contacting with the balls 33, in order to thrust the balls 34 inward so that they can contact with the preselecting shifting sleeves 37. This is clearly illustrated in Fig. 7. Located in the housing 28 are the operating bars 38. These bars are provided with teeth 39 so as to form racks which mesh with the gear 40. The bars 38 are provided with sleeves 41. These sleeves are rigidly secured to the bars and are provided with forks 42 which fit into the grooves 43 formed in the shifting sleeves 37. The shifting sleeves are further each provided with a longitudinal groove or slot 44 and with a projection 45. The slot 44 is for the purpose of allowing the balls 34 to extend therein and the sleeve 37 to pass without contacting therewith when it is not desired to move that particular shift bar, while the projection 45 is designed to contact with the projection or enlargements 31 for shifting purposes. One of the bars 38 is provided with a flat portion 46 which fits into the fork 47 of the lever 48. This lever is pivotally secured to a lug 49 formed integral with the housing 11. The opposite end of the lever 48 is pivotally secured to a rod 50ª which extends forward and is in turn secured to the clutch lever, not shown, of an automobile. The bars 38 are returned to their normal positions as shown in Fig. 6, by means of a coil spring 49. This spring may be either an expansion spring as shown in Fig. 6, so that the tendency to move the bars will be due to the compression set up when the bars are operated, or its action may be reversed, so that it will be expanded when the bars 38 are operated and contract when the clutch is again let in or seated. Secured to the housing 28 is a plate 50 and secured to this plate is a cover 51. The cover 51 is provided with a recessed portion 52 and with openings 53 and 54. Through the openings 53 and 54 extend the shafts or bars 38, 38, 29 and 30. The cover is also provided with a slot 55 through which a pin 56 projects. (See Fig. 4.) This pin is held in place by means of a bar 57 which prevents it from coming out of the slot 55. The plate 50 is provided with openings 58 and 59 through which the shafts 38, 38, 29 and 30 extend and with an opening 60 through which the reduced portion 61 of the preselecting shaft 62 extends. This shaft is provided with a key 63 and on this shaft are slidably mounted the shifting sleeves 37. Adjacent the forward end of the reduced portion 61 is the pinion 64 which meshes with the segment 65. This segment is mounted in the cover 51 on a pivot or short shaft 66 and is provided with upwardly extending bars 67 between which is pivotally secured the preselecting lever 68. The preselecting lever 68 is held in contact with the plate 50 by means of a leaf spring 69 which is secured to the segment and moved therewith. The plate 50 is provided with a fan shaped recess 70 in which is mounted a plate 71, this plate having projections or ears 72. The plate is swingingly mounted in the recess 70 on the pivot 66 and acts as a floating stop, to limit the movements of the foot lever 68 when being operated as will be described. The preselecting lever 68 is provided near its upper end with a rectangular portion 73 which is adapted to fit into the rectangular opening 74 formed in the plate 75.

Above the rectangular portion 73 is formed a cylindrical portion 76 which has its upper end screw threaded as at 77 and over the cylindrical portion is fitted a sleeve 78 which is preferably of resilient material. The sleeve 78 is secured in position by means of a nut or cap 79, which prevents it from slipping upward. The upper end of the plate 50 as well as the cover 51 is curved, the cover 51 being provided on its curved edge with recesses 81, 82, 83 and 84. In these recesses the ball 85 which is carried in the housing 86 is adapted to seat itself and prevent accidental movement of the lever 68 due to road shocks and the like. This ball is preferably held downward by a coil spring 87.

The operation of my device is as follows:

The lever 68 being in the central position as illustrated in the drawings—the clutch is first pushed forward or thrown out of engagement as far as possible. This assures the transmission being in neutral, the engine is then started. When it is desired to start forward, the lever 68 is kicked to the left as far as it will go. This will be limited by one of the ears 72, this places the transmission and selecting devices in position for low speed. The clutch is then thrown out or disengaged to its fullest extent. This movement will operate the lever 48, pushing the lower portion thereof toward the housing 11, while the upper portion will be drawn forward. This shifts the toothed operating bar with which the lever 48 is connected to the left, as represented in Fig. 6, and such bar operates the gear 40, which transmits motion so as to shift the other bar 38 in the opposite direction. These movements through the action of the sleeves 41 and forks 42, bring the preselecting sleeves 37 toward each other and the projection formed on the proper preselecting sleeve contacts with the enlargement 31 formed on the shifting bar 29 and to this enlargement is secured the fork 26 which shifts the gear 22 into engagement with the gear 17. On releasing the clutch lever or allowing the clutch to enter into engagement, the car is started forward at low speed. The lever 68 is now kicked to the right as far as it will go, which movement is limited by the other ear 72 on the plate 71. This movement now throws the projection 45 on the shifting sleeve which has already engaged with the enlargement 31 into the position shown in Fig. 9, and disengaging of the clutch now causes the sleeve which is to the front of the housing 11 to engage with one of the balls 34 as shown in Fig. 7. This disengages the gears 22 and 17. When this disengagement has taken place, the ball 33 which was resting on the projection 35, being now free moves outward and allows the ball 34 to free itself from engagement with the sleeve 37. The projection 45 now takes hold of the opposite projection 31 and shifts the gear 23 into mesh with the gear 16, which will bring the machine into second speed. In order to bring the machine into high speed, the foot is placed upon the plate 75 and the lever 68 pressed forward so that it will clear the tongue 72. It is then kicked over to the left as far as it will go. This places the shifting mechanism in condition for high speed and revolves the shifting sleeves 37 so that the groove 44 on the sleeve during the shifting has passed the balls 34, while the projection 45 is turned in such a direction that it will mesh with the projection 31 formed on the shifting bar last operated. The forward movement or throwing out of the clutch moves the shifting sleeves 37 toward each other, causing the projection 45 on the sleeve to the rear to contact with the projection 31 on the shifting bar 30, thus pushing it forward and causing the hubs 24ª and 25ª to engage. During this operation the ball 33 will necessarily ride up on the inclined face 26 of the projection 35 and force one of the balls 34 inward, but the recesses 44 formed in the sleeves 37 being opposite the projection 45 on the opposite sleeve, will allow the balls to lie therein.

When it is desired to place the machine in neutral, the plate 75 is pressed forward with the foot and held in that position and swung to the left or right as the case may be. This makes the lever 68 contact with the pin 56 and carry the pin with the lever. The movement of this pin is regulated by the slot 55 and when it has reached the end of the slot, the lever necessarily must stop. This allows the ball 85 to drop into the central recess 80 and by the disengagement of the clutch, will cause the sleeves 37 to move forward and engage whichever ball 34 may project from the enlargement 31 and shift the device into neutral. In order to place the machine into reverse, the lever 68 is moved as far to the left as the plate 71 will permit, then pressed forward so as to clear the ear 72 and again moved to the left as far as it will go. The plate 71 and ears 72 are so arranged in the recess as to form a floating lock, in other words, by the mere shifting of the lever 68 without forward pressure on the plate 75, the shifting can take place between two positions only, that is, either reverse and first, first or second, or between second and third, or high. This floating lock is especially desirable when driving in crowded traffic, as the machine can be shifted into high and then the preselecting device set for second speed and in the event of a sudden stop or necessity of suddenly shifting from high to second, the mere disengagement of the clutch is sufficient to accomplish this shifting without any necessity of thought upon the part of the driver. In fact, the device can be immediately set after being placed into high and with the throwing out of the clutch will shift the gears into neutral or into first or second speed as desired.

By the use of my device it is not necessary to remove the hands from the wheel at any time to shift gears. All stripping of gears is eliminated, due to the fact that the clutch must be first completely disengaged before any shifting can take place, furthermore, the hand shift lever extending upwardly into the machine in such a position that it might interfere with the occupants of the front seat, is done away with, and the accidental or playful shifting of the lever and the consequent disengaging of the gear mechanism while the machine is in operation prevented. In fact, it is impossible for anyone but the driver of the machine to shift gears, since the shifting of gears is accomplished through the manipulation of the clutch pedal.

Having fully described my invention, what I claim is:

1. A foot speed selector for automobiles, comprising a sliding gear transmission and its casing, a gear shifting mechanism, means for operating the gear shifting mechanism, a preselecting mechanism mounted in said casing, a foot lever in communication with said preselecting mechanism for operating the same and pivotally mounted on said casing, and means for limiting the movement of the foot lever between two adjacent speeds.

2. A foot speed selector for automobiles, comprising a sliding gear transmission and its casing, a foot operated mechanism for preselecting a predetermined speed secured thereto, and means for limiting the movement of the foot operated mechanism between two preselected speeds.

3. A foot speed selector for automobiles, comprising a sliding gear transmission and its casing, a gear shifting mechanism, a preselecting mechanism secured to said casing, a foot lever for operating the preselecting mechanism pivotally mounted in said casing, and means for limiting the movement of the foot operated mechanism between two preselected speeds.

4. A foot speed selector for automobiles, comprising a sliding gear transmission and its casing, gear shifting devices mounted in said casing, a shaft rotatably located in said casing, sleeves slidably mounted on said shaft and rotatable therewith, said sleeves adapted when slidably moved to contact with certain of the gear shifting devices, a foot operated lever capable of side movement, a support for said lever, a connection between the rotatable shaft and foot lever for rotating said shaft and sleeves for preselecting a predetermined speed, and means for moving said sleeves to and from each other simultaneously whereby the preselected shifting device is operated.

5. A foot speed selector comprising a sliding gear transmission and its casing, gear shifting devices slidably mounted in said casing, a shaft rotatably mounted in said casing, sleeves each having a projection and a recess and capable of simultaneous movement to and from each other mounted on said shaft and rotatable therewith, a foot lever capable of lateral movement, a support for said foot lever, a connection between the foot lever and rotatable shaft whereby the movement of said foot lever will rotate the shaft and sleeves for preselecting a predetermined speed, and means for actuating said sleeves to and from each other whereby the projection on one sleeve is caused to operate the preselected shifting device for shifting the transmission to the preselected speed.

6. A foot speed selector for automobiles, comprising a sliding gear transmission and its casing, gear shifting devices mounted in said casing, a shaft rotatably located in said casing, sleeves slidably secured on said shaft and rotatable therewith, a gear mounted on said shaft, a segment pivotally mounted and meshing with said gear, and a foot operated lever capable of side movement for placing said segment in motion.

7. A foot speed selector for automobiles, comprising a sliding gear transmission and its casing, gear shifting devices mounted in said casing, a shaft rotatably mounted in said casing, sleeves capable of simultaneous movement to and from each other mounted on said shaft and rotatable therewith, a gear secured on said shaft, a foot lever having a segment and capable of side movement, said segment adapted to mesh with said gear and rotate the shaft for preselecting a speed, means for actuating said sleeves to and from each other, and means carried by the sleeves for actuating the shifting devices.

8. A foot speed selector comprising a sliding gear transmission and its casing, a rotating mechanism located in said casing for preselecting a predetermined speed, a foot lever capable of being operated from side to side, a support for said foot lever, a connection between the foot lever and preselecting mechanism for rotating the same for preselecting a predetermined speed, and a means for operating the preselecting mechanism longitudinally so as to shift gears.

9. A foot speed selector comprising a sliding gear transmission and its casing, a gear shifting mechanism located therein, a preselecting mechanism rotatably and slidably mounted in said casing adjacent the gear shifting mechanism, a preselecting foot lever capable of being moved from side to side, a support for said foot lever, said foot lever and preselecting mechanism for rotating the same, and means for slidably operating the preselecting mechanism for operating the preselected gear shifting mechanism.

10. A foot speed selector comprising a sliding gear transmission and its gear shifting mechanism, rotatable sliding elements adjacent the gear shifting mechanism and adapted to co-operate therewith, a pivoted foot lever capable of being rocked from side to side, a support for said foot lever, a connection between said foot lever and the sliding elements for rotating the same for preselecting a predetermined speed, and means for sliding said elements toward and from each other simultaneously, whereby the shifting to the preselected speed is accomplished.

11. A foot speed selector, comprising the combination with a sliding gear transmission, its casing, and gear shifting mechanism, of sliding elements capable of simultaneous movement in opposite directions for operating said shifting mechanism, a foot lever for operating said sliding elements, a second foot lever pivotally mounted, a support for said lever, a connection between the second foot lever and the sliding elements for rotating said sliding elements, and means carried by said sliding elements for operating said shifting mechanism, whereby said transmission is shifted to a preselected speed.

12. A foot speed selector comprising a sliding gear transmission and its gear shifting mechanism, rotating slidable elements adjacent the gear shifting mechanism and provided to contact therewith, a foot lever capable of being moved from side to side, a support for said foot lever, a connection between the foot lever and the sliding elements for rotating the same for preselecting a predetermined speed, and means for sliding said elements to and from each other simultaneously, whereby the shifting to the preselected speed is accomplished.

In testimony whereof, I have signed my name to this specification.

JASPER BLACKBURN.